US012604011B2

(12) United States Patent
Lim

(10) Patent No.: US 12,604,011 B2
(45) Date of Patent: Apr. 14, 2026

(54) VIDEO SIGNAL ENCODING/DECODING METHOD, AND RECORDING MEDIUM IN WHICH BITSTREAM IS STORED

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 18/726,585

(22) PCT Filed: Jan. 4, 2023

(86) PCT No.: PCT/KR2023/000150
§ 371 (c)(1),
(2) Date: Jul. 3, 2024

(87) PCT Pub. No.: WO2023/132623
PCT Pub. Date: Jul. 13, 2023

(65) Prior Publication Data
US 2025/0080757 A1 Mar. 6, 2025

(30) Foreign Application Priority Data
Jan. 5, 2022 (KR) ........................ 10-2022-0001535

(51) Int. Cl.
*H04N 19/172* (2014.01)
*H04N 19/184* (2014.01)
(52) U.S. Cl.
CPC ......... *H04N 19/172* (2014.11); *H04N 19/184* (2014.11)

(58) Field of Classification Search
CPC .................................................... H04N 19/172
See application file for complete search history.

(56) References Cited

U.S. PATENT DOCUMENTS

| | | | |
|---|---|---|---|
| 2013/0089152 A1 | 4/2013 | Wang et al. | |
| 2014/0192896 A1 | 7/2014 | Wang et al. | |
| 2014/0192897 A1 | 7/2014 | Wang et al. | |
| 2021/0368191 A1* | 11/2021 | Sim ...................... | H04N 19/176 |
| 2022/0014769 A1 | 1/2022 | Sim et al. | |
| 2023/0308671 A1 | 9/2023 | Sim et al. | |

FOREIGN PATENT DOCUMENTS

| | | |
|---|---|---|
| KR | 10-2015-0105373 A | 9/2015 |
| KR | 10-2020-0110213 A | 9/2020 |
| KR | 10-2020-0132753 A | 11/2020 |
| KR | 10-2021-0037508 A | 4/2021 |

OTHER PUBLICATIONS

Korean Intellectual Property Office, International Search Report of International Application No. PCT/KR2023/000150, Apr. 19, 2023.
Korean Intellectual Property Office, Written Opinion of International Application No. PCT/KR2023/000150, Apr. 19, 2023.

* cited by examiner

*Primary Examiner* — Jerry T Jean Baptiste
(74) *Attorney, Agent, or Firm* — IP Legal Services, LLC

(57) ABSTRACT
An image decoding method according to the present disclosure comprises the steps of: when a random access: is performed, sequentially decoding pictures belonging to a random access group; and outputting, as a reconstructed picture, a last picture from among the pictures belonging to the random access group.

14 Claims, 8 Drawing Sheets

Reference picture buffer

Reconstructed point
(P8)

Intra region

Completely Coded Region

Incompletely Coded Region

| I0 | I1 | I2 | I3 | I4 | I5 | I6 | I7 | I8 | I9 | ⋯ |

(a)

| I0 | P1 | P2 | P3 | P4 | I5 | P6 | P7 | P8 | P9 | ⋯ |

(b)

Intra region

Completely Coded Region

Incompletely Coded Region

Random access position          P6          P7          Reconstructed point
        (P5)                                                      (P8)

▨ Intra region

▧ Completely Coded Region

▦ Incompletely Coded Region

Reference picture buffer

Random access          P6          P7          Reconstructed
  position                                          point
    (P5)                                            (P8)

▨ Intra region

▧ Completely Coded Region

▦ Incompletely Coded Region

Reference picture(P5)          Current picture(P9)

Reference picture buffer

Reconstructed point
(P8)

Figure 11:
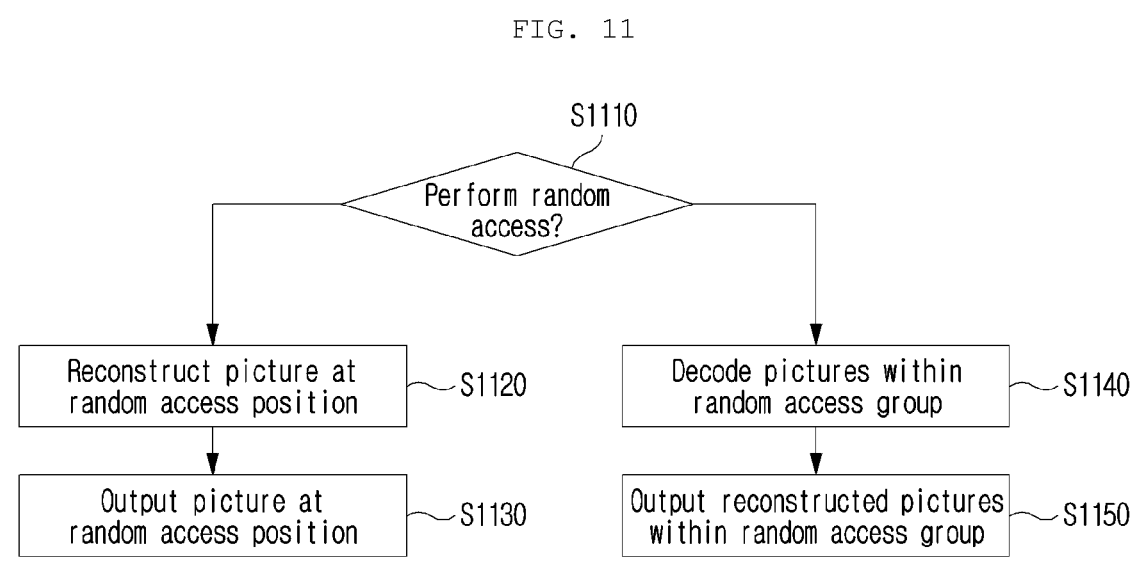

Perform random
access?

Reconstruct picture at
random access position ～S1120

Output picture at
random access position ～S1130

Decode pictures within
random access group ～S1140

Output reconstructed pictures
within random access group ～S1150

VIDEO SIGNAL ENCODING/DECODING METHOD, AND RECORDING MEDIUM IN WHICH BITSTREAM IS STORED

CROSS REFERENCE TO RELATED APPLICATIONS

This application is a National Stage Patent Application of PCT International Patent Application No. PCT/KR2023/000150 (filed on Jan. 4, 2023) under 35 U.S.C. § 371, which claims priority to Korean Patent Application No. 10-2022-0001535 (filed on Jan. 5, 2022), the teachings of which are incorporated herein in their entireties by reference.

TECHNICAL FIELD

The present disclosure relates to a method and a device for processing a video signal.

BACKGROUND ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Problem

The present disclosure is to provide a video encoding/decoding method available for random access without an intra picture.

The purpose of the present disclosure is to provide a method for encoding/decoding pictures in a random access group by gradually expanding a reconstructed region and a device for performing the same.

Technical effects of the present disclosure may be non-limited by the above-mentioned technical effects, and other unmentioned technical effects may be clearly understood from the following description by those having ordinary skill in the technical field to which the present disclosure pertains.

Technical Solution

An image decoding method according to the present disclosure includes sequentially decoding pictures belonging to a random access group when a random access is performed, and outputting, as a reconstructed picture, a last picture among pictures belonging to the random access group.

An image encoding method according to the present disclosure includes sequentially encoding pictures belonging to a random access group when a random access is performed, and encoding information for specifying pictures belonging to the random access group.

In an encoding/decoding method according to the present disclosure, at least one of the remaining pictures excluding the reconstructed picture among pictures belonging to the random access group may be composed of a completely reconstructed region and an incompletely coded region.

In an encoding/decoding method according to the present disclosure, the incompletely coded region may not be completely reconstructed when the random access is performed, and may be completely reconstructed when the random access is not performed.

In an encoding/decoding method according to the present disclosure, the completely reconstructed region includes at least one of an intra region or a completely coded region, and the completely coded region may be reconstructed through at least one of intra prediction or inter prediction using a picture with output order earlier than a current picture in the random access group as a reference picture.

In an encoding/decoding method according to the present disclosure, the completely coded region in the current picture may include a region corresponding to an intra region in a previous picture.

In an encoding/decoding method according to the present disclosure, for each of the remaining pictures excluding the reconstructed picture among pictures belonging to the random access group, information for specifying the intra region may be explicitly encoded and signaled.

In an encoding/decoding method according to the present disclosure, the intra region may be determined based on prediction type information of a sub-picture, a tile or a slice.

In an encoding/decoding method according to the present disclosure, the random access group may be composed of pictures whose prediction type is a P type.

In an encoding/decoding method according to the present disclosure, when decoding of a picture corresponding to a random access position in the random access group is completed, Decoded Picture Buffer (DPB) may be initialized.

In an encoding/decoding method according to the present disclosure, when a current picture is a picture whose output order is later than pictures belonging to the random access group, only the reconstructed picture among pictures belonging to the random access group may be used as a reference picture of the current picture.

In an encoding/decoding method according to the present disclosure, when a current picture is a picture whose output order is later than pictures belonging to the random access group and a current block in the current picture uses one of pictures belonging to the random access group as a reference picture, a motion vector of the current block may be forced to indicate the inside of a completely reconstructed region of the reference picture.

In an encoding/decoding method according to the present disclosure, the motion vector of the current block may be derived by adding a motion vector difference value and a distance between the current block and the completely reconstructed region in the reference picture.

In an encoding/decoding method according to the present disclosure, information indicating a size of the random access group may be explicitly signaled through a bitstream.

The features briefly summarized above with respect to the present disclosure are just an exemplary aspect of a detailed description of the present disclosure described below, and do not limit a scope of the present disclosure.

Technical Effect

According to the present disclosure, an video encoding/decoding method available for random access without an intra picture may be provided.

According to the present disclosure, a reconstructed region may be gradually expanded by pictures in a random access group, improving encoding/decoding efficiency.

Effects obtainable from the present disclosure are not limited to the above-mentioned effects and other unmentioned effects may be clearly understood from the following description by those having ordinary skill in the technical field to which the present disclosure pertains.

BRIEF DESCRIPTION OF DRAWINGS

FIG. 3 shows prediction information of pictures constituting a video.

FIG. 11 is a flowchart showing a method for decoding a picture according to an embodiment of the present disclosure.

BEST MODE

Figure 1:
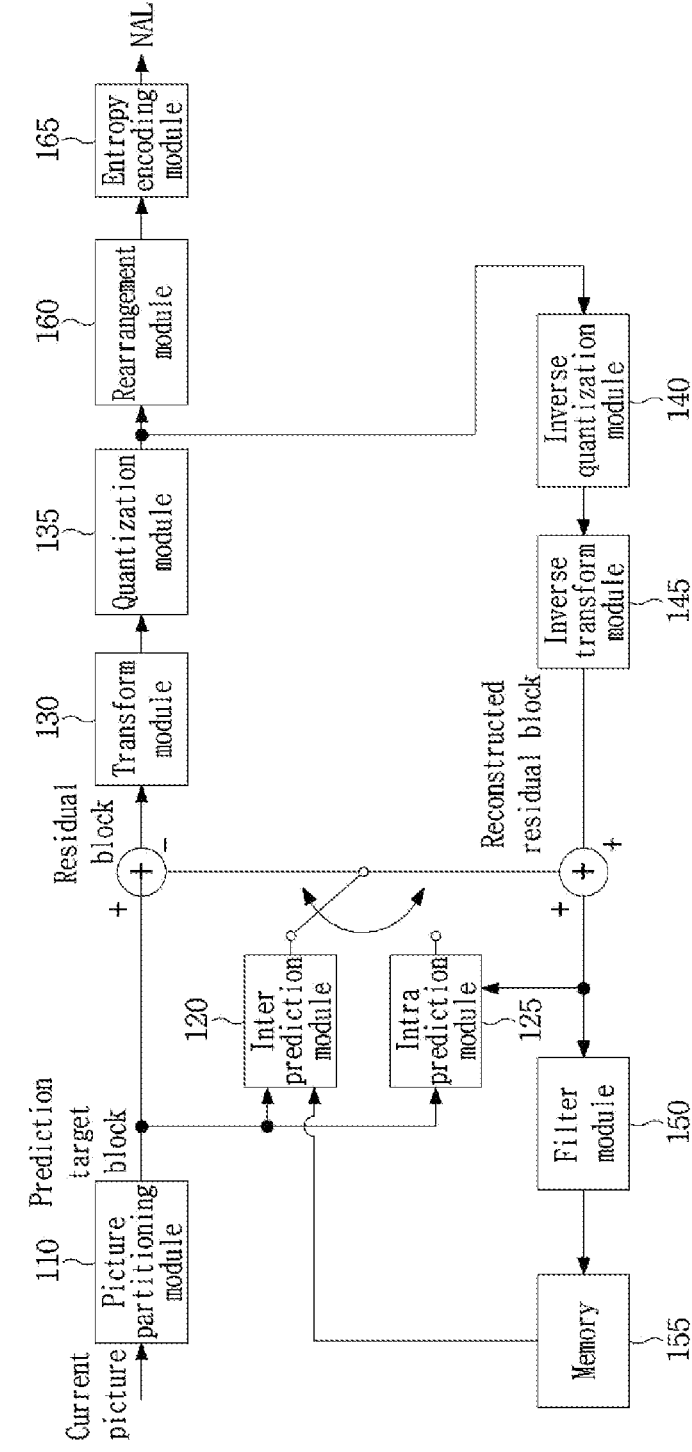
FIG. 1 is a block diagram showing an image encoding device according to an embodiment of the present disclosure.

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference numeral was used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term of and/or includes a combination of a plurality of relative entered items or any item of a plurality of relative entered items.

When a component is referred to as being "linked" or "connected" to other component, it should be understood that it may be directly linked or connected to that other component, but other component may exist in the middle. On the other hand, when a component is referred to as being "directly linked" or "directly connected" to other component, it should be understood that other component does not exist in the middle.

As terms used in this application are just used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, steps, motions, components, parts or their combinations entered in the specification, but is not to exclude a possibility of addition or existence of one or more other characteristics, numbers, steps, motions, components, parts or their combinations in advance.

Hereinafter, referring to the attached drawings, a desirable embodiment of the present disclosure will be described in more detail. Hereinafter, the same reference numeral is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit shown in FIG. 1 is independently shown to represent different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an: integrated embodiment and a separated embodiment of each construction unit are also included in a scope of a right of the present disclosure unless they are departing from the essence of the present disclosure.

Further, some components may be just an optional component for improving performance, not a necessary component which perform an essential function in the present disclosure. The present disclosure may be implemented by including only a construction unit necessary for implementing the essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this case, a processing unit may be a prediction unit (PU), a transform unit (TU) or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (e.g., a cost function).

For example, one picture may be partitioned into a plurality of coding units. In order to partition a coding unit in a picture, a recursive tree structure such as a quad tree, a ternary tree or a binary tree may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In an example, when it is assumed that quad tree partitioning is applied to one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or a size different from another prediction unit.

In intra prediction, a transform unit may be configured to be the same as a prediction unit. In this case, after partitioning a coding unit into a plurality of transform units, intra prediction may be performed per each transform unit. A coding unit may be partitioned in a horizontal direction or in a vertical direction. The number of transform units generated by partitioning a coding unit may be 2 or 4 according to a size of a coding unit.

Prediction units 120 and 125 may include an inter prediction unit 120 performing inter prediction and an intra prediction unit 125 performing intra prediction. Whether to perform inter prediction or intra prediction for a coding unit may be determined and detailed information according to each prediction method (e.g., an intra prediction mode, a motion vector, a reference picture, etc.) may be determined. In this case, a processing unit that prediction is performed may be different from a processing unit that a prediction method and details are determined. For example, a prediction method, a prediction mode, etc. may be determined in a coding unit and prediction may be performed in a prediction unit or a transform unit. A residual value (a residual block) between a generated prediction block and an original block may be input to a transform unit 130. In addition, prediction mode information, motion vector information, etc. used for prediction may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, a 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a ½ or ¼ pixel unit based on an interpolated pixel. A motion prediction unit may predict a current prediction unit by varying a motion prediction method. As a motion prediction method, various methods such as a skip method, a merge method, an advanced motion vector prediction (AMVP) method, an intra block copy method, etc. may be used.

An intra prediction unit 125 may generate a prediction unit based on reference pixel information which is pixel information in a current picture. Reference pixel information may be derived from selected one of a plurality of reference pixel lines. A N-th reference pixel line among a plurality of reference pixel lines may include left pixels whose x-axis difference with a top-left pixel in a current block is N and top pixels whose y-axis difference with the top-left pixel is N. The number of reference pixel lines which may be selected by a current block may be 1, 2, 3 or 4.

When a neighboring block in a current prediction unit is a block which performed inter prediction and accordingly, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least information of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position.

An intra prediction method may generate a prediction block after applying a smoothing filter to a reference pixel according to a prediction mode. According to a selected reference pixel line, whether a smoothing filter is applied may be determined.

In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit, and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block including residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on at least one of a size of a transform unit, a form of a transform unit, a prediction mode in a prediction unit or intra prediction mode information in a prediction unit.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement of a coefficient value for a quantized residual value.

A rearrangement unit 160 may change a coefficient in a shape of a two-dimensional block into a shape of a one-dimensional vector through a coefficient scan method. For example, a rearrangement unit 160 may scan a DC coefficient to a coefficient in a high-frequency domain by using a zig-zag scan method and change it into a shape of a one-dimensional vector. According to a size of a transform unit and an intra prediction mode, instead of zig-zag scan, vertical scan where a coefficient in a shape of a two-dimensional block is scanned in a column direction, horizontal scan where a coefficient in a shape of a two-dimensional block is scanned in a row direction or diagonal scan where a coefficient in a shape of a two-dimensional block is scanned in a diagonal direction may be used. In other words, which scan method among zig-zag scan, vertical directional scan, horizontal directional scan or diagonal scan will be used may be determined according to a size of a transform unit and an intra prediction mode.

An entropy encoding unit 165 may perform entropy encoding based on values calculated by a rearrangement unit 160. Entropy encoding, for example, may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information and block type information in a coding unit, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 dequantize values quantized in a quantization unit 135 and inversely transform values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter will be applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether to apply ALF may be transmitted per coding unit (CU) for a luma signal and a shape and a filter coefficient of an ALF filter to be applied may vary according to each block. In addition, an ALF filter in the same shape (fixed shape) may be applied regardless of a characteristic of a block to be applied.

A memory 155 may store a reconstructed block or picture calculated through a filter unit 150 and a stored reconstructed block or picture may be provided to prediction units 120 and 125 when performing inter prediction.

Figure 2:
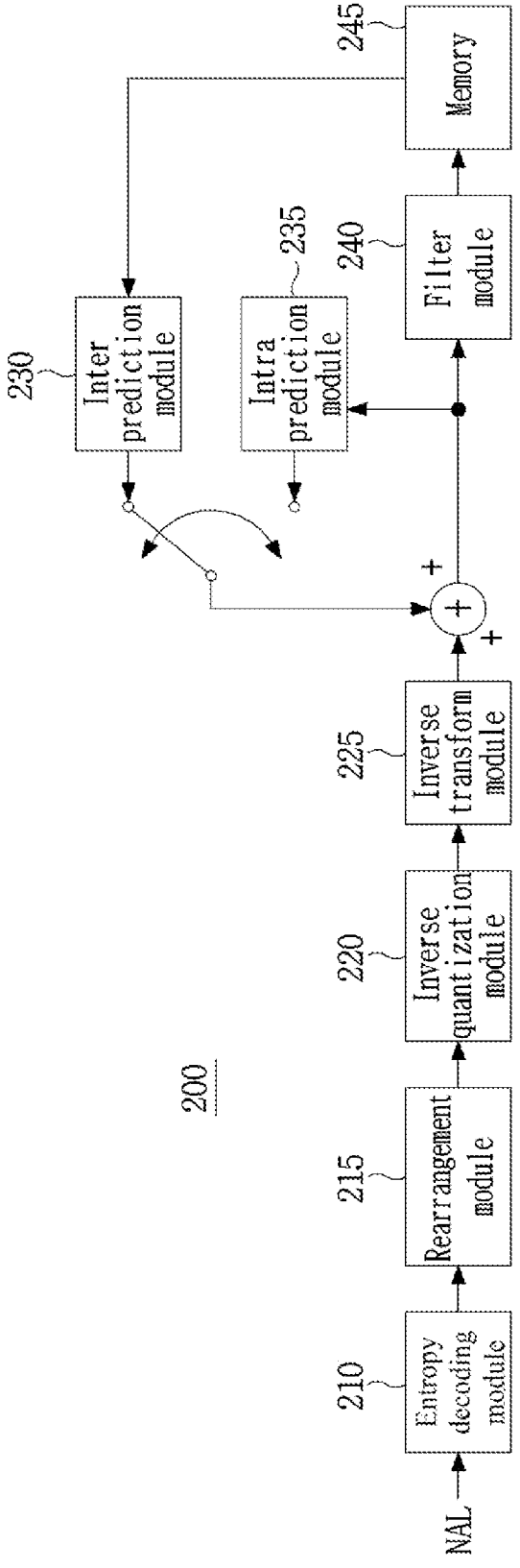
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to that of an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients expressed in a form of a one-dimensional vector may be rearranged by being reconstructed into coefficients in a form of a two-dimensional block. A rearrangement unit 215 may receive information related to coefficient scanning performed in an encoding unit and perform rearrangement through a method in which scanning is inversely performed based on scanning order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size or a shape of a current block, a prediction mode, an intra prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. An intra prediction unit 235 may include an adaptive intra smoothing (AIS) filter, a reference pixel interpolation unit and a DC filter. As a part performing filtering on a reference pixel of a current block, an AIS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction, etc. applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit) or a block to which an in-loop filter is applied, etc. according to an encoding/decoding step. In this specification, 'unit' may represent a base unit for performing a specific encoding/decoding process and 'block' may represent a pixel array in a predetermined size. Unless otherwise classified, 'block' and 'unit' may be used interchangeably. For example, in the after-described embodiment, it may be understood that a coding block (a coding block) and a coding unit (a coding unit) are used interchangeably.

Furthermore, a picture including a current block is referred to as a current picture.

Generally, a size of data for encoding/decoding a video is large. Accordingly, in order to store or transmit a video, a video capture device such as a camera, i.e., an encoder performs compression (i.e., encoding) of a video, and a video playback device such as a smartphone or a television, i.e., a decoder performs reconstruction (i.e., decoding) for video playback.

In this case, encoding/decoding for each picture existing in a video may be performed in a unit of a block. As an example, each picture may be partitioned into CTUs, CUs, TUs or PUs according to an encoding/decoding operation.

When encoding for a picture is performed, a prediction type for a picture may be set to be one of type I, type P or type B.

Type I shows that only intra prediction may be performed. P type shows that intra prediction and unidirectional inter prediction may be performed. Type B shows that intra prediction, unidirectional inter prediction and bidirectional inter prediction may be performed.

A prediction type may be set per picture, slice, sub-picture, tile or any region within a picture. For convenience of a description, it is assumed that a prediction type is determined in a unit of a picture in embodiments described later. In addition, a picture whose prediction type is type I is referred to as I picture, a picture whose prediction type is type P is referred to as P picture and a picture whose prediction type is type B is referred to as B picture. Alternatively, a picture whose prediction type is type I is referred to as an intra picture, and a picture whose prediction type is type P or type B is referred to as inter picture.

Figure 3:
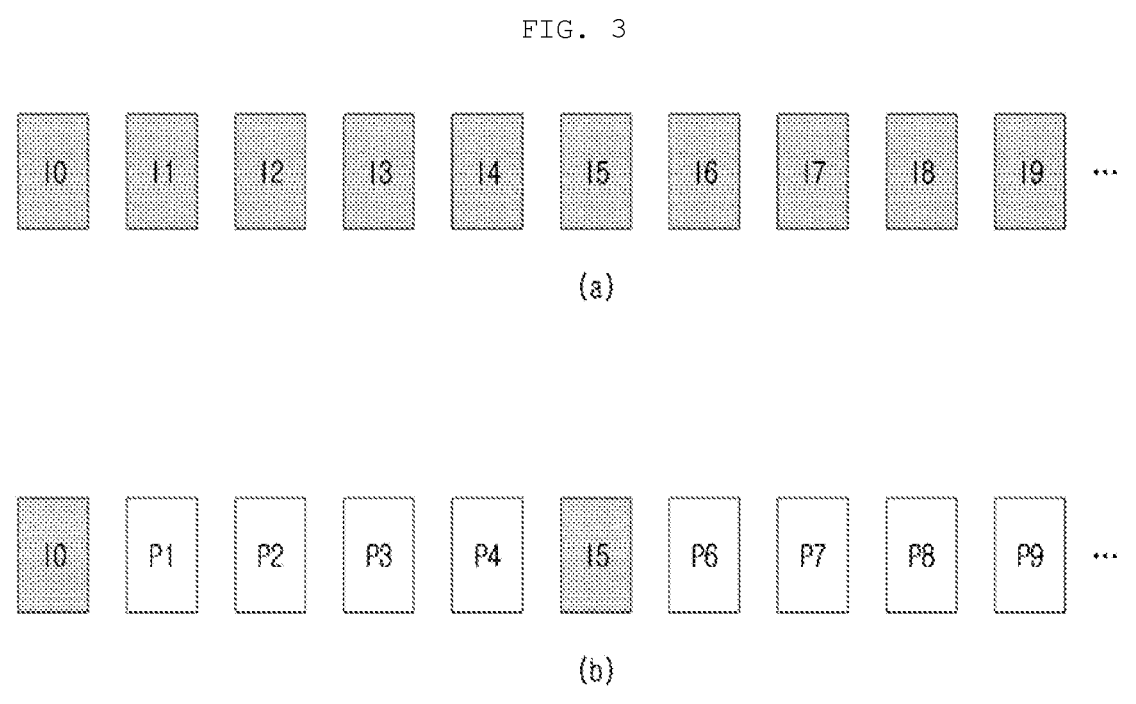

FIG. 3 shows prediction information of pictures constituting a video.

FIG. 3(a) shows an example in which a video consists of only I pictures (I0~I9), and FIG. 3(b) shows an example in which a video consists of I pictures (I0, I5) and P pictures (P1~P4, P6~P9).

An intra picture (i.e., I picture) may exist at a predetermined period. As an example, in FIG. 3(b), it is illustrated that there are four P pictures between I pictures.

When playing a video, it may be played sequentially from a first picture, or it may be played from a random point. A method for playing a video from a random point may be defined as a random access method.

As an example, in an example shown in FIG. 3(a), a video may be played sequentially from I0 picture, and if a user selects I8 picture, a video may be played from I8 picture selected by a user.

For an intra picture, there is no dependency between pictures. Accordingly, there is no problem in playing I8 picture even if another picture is not decoded in advance.

In an example shown in FIG. 3(b), when P8 picture is encoded by using inter prediction using preceding P7 picture as a reference picture, in order to play P8 picture, P7 picture must be completely reconstructed first.

Likewise, if P7 picture is encoded based on inter prediction using another reference picture, P7 picture may be reconstructed only when a reference picture of P7 picture must be reconstructed first. In this way, in order to decode P picture and B picture, a reference picture for inter prediction must be decoded first.

As a result, a position where random access is performed, i.e., a random access position must be I picture. In this case, information specifying a random access position may be signaled through a Network Abstract Layer (NAL) unit header. Specifically, a random access position may be specified by information showing a type of a NAL unit.

Generally, it is known that encoding efficiency of a picture is in the order of B picture, P picture and I picture. Here, encoding efficiency means that an encoded bit rate is low. Since random access is possible only for I picture, if I picture is inserted between pictures for random access, a problem occurs that a bit rate of the entire video increases.

Figure 4:
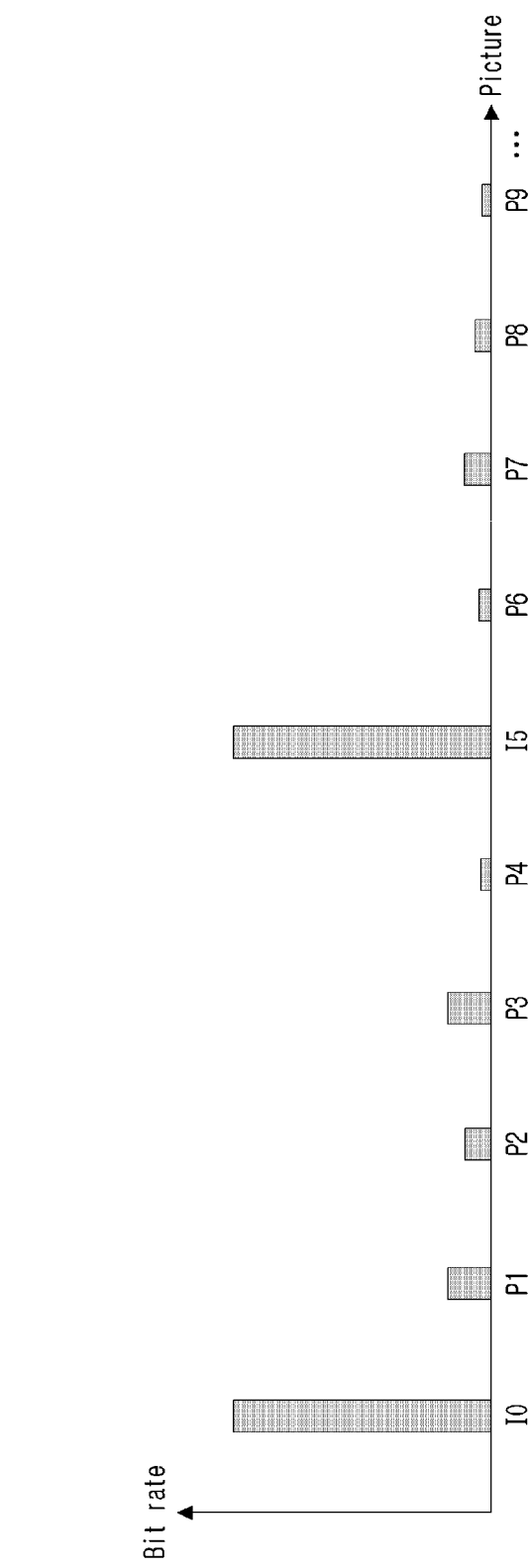
FIG. 4 is an example showing a bit rate of a video in which I picture is inserted.

FIG. 4 is an example showing a bit rate of a video in which I picture is inserted.

As in an example shown in FIG. 4, if I picture is inserted at every predetermined interval for random access, a bit rate may increase due to I picture. An increased bit rate of a video may cause a problem in terms of bit rate control and error resilience.

In order to solve the problem, the present disclosure proposes a method for performing random access even without using I picture.

Figure 5:
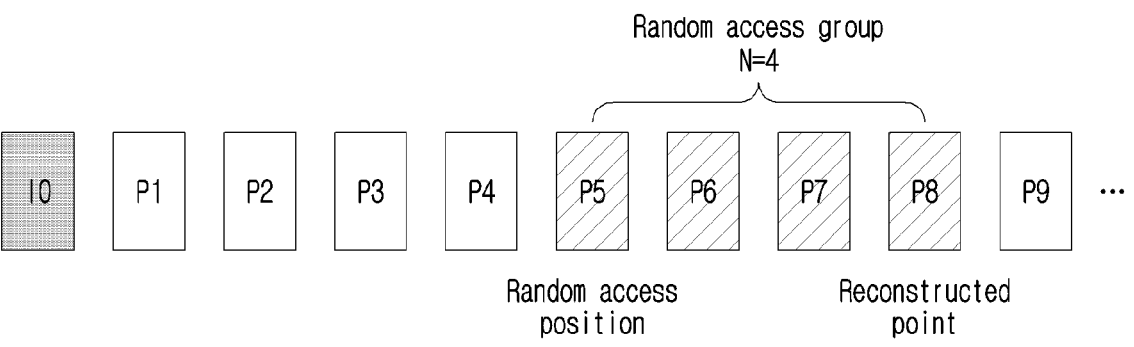
FIG. 5 is a diagram for describing an example in which random access is performed without using I picture.

FIG. 5 is a diagram for describing an example in which random access is performed without using I picture.

In order to perform random access without using I picture, a random access group may be designated. A random access group may include a picture at a random access position and (N-1) pictures whose output order (i.e., POC, Picture Order Count) is consecutive from the picture at a random access position. In an example shown in FIG. 5, it was shown that a random access group is composed of 4 pictures (i.e., N is 4).

N, the number of pictures constituting a random access group, may be a predefined value in an encoder and a decoder. Alternatively, information showing N, the number of pictures, may be encoded and signaled through a bitstream. Alternatively, pictures referring to the same sequence parameter set (SPS) may be set as one random access group.

Alternatively, pictures belonging to a random access group may be specified through a NAL unit header. Among pictures belonging to a random access group, a picture with the earliest output order may be set as a random access position, and a picture with the latest output order may be set as a reconstructed picture.

Alternatively, only information specifying a reconstructed picture and a picture that is a random access position within a random access group may be encoded and signaled. Pictures that are later in output order than a picture that is a random access position and earlier than a reconstructed picture may constitute the same random access group as a picture that is a random access position and a reconstructed picture.

As in an example shown in FIG. 5, a random access group may consist of only P pictures.

Pictures in a random access group may be sequentially encoded/decoded according to coding order. The coding order of pictures within a random access group may be determined according to output order. In other words, coding order may be determined according to output order.

Alternatively, the coding order of pictures in a random access group may be determined regardless of output order, but the coding order of a picture that is last in output order in a random access group may be fixed to the last.

A picture that is last in output order in a random access group may be output as a reconstructed picture. An example, in an example shown in FIG. 5, a random access position is P5 picture, but according to a decoding process, playback starts from P8 picture. In other words, complete decoding may be possible for a picture that is last in output order among pictures in a random access group.

In order to completely reconstruct a picture that is last in output order within a random access group, a size of a completely reconstructed region may be increased sequentially according to coding order.

Figure 6:
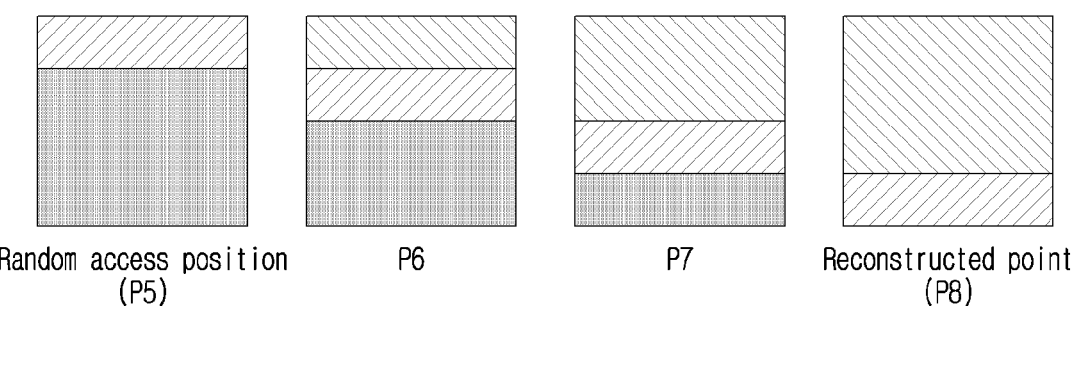
FIG. 6 is a diagram for describing reconstructed regions of pictures within a random access group.
Figure 6:
Figure 6:

FIG. 6 is a diagram for describing reconstructed regions of pictures within a random access group.

In an example shown in FIG. 6, an intra region represents a region where only intra prediction is used. An intra region may be completely reconstructed, regardless of whether a reconstructed picture exists before a current picture.

Intra prediction as well as inter prediction may be applied to a completely coded region and an incompletely coded region. In this case, a region corresponding to complete coding of a current picture in a previous picture may be a completely reconstructed region. Here, a region corresponding to a completed coded region represents a region with the same size and position as a completely coded region in a previous picture. A completely coded region may be completely reconstructed even during random access, based on at least one of intra prediction or inter prediction referring to a completely reconstructed region of at least one of previous pictures.

A region corresponding to incomplete coding of a current picture in a previous picture may be a region that is not completely reconstructed. Here, a region corresponding to an incompletely coded region represents a region with the same size and position as an incompletely coded region in a previous picture. Since a region corresponding to an incompletely coded region is not completely reconstructed, an incompletely coded region may not be completely reconstructed in random access.

Accordingly, whether an incompletely coded region may be completely reconstructed may vary depending on whether random access is performed. As an example, when random access is not performed, an incompletely coded region may be completely reconstructed through intra prediction or inter prediction. On the other hand, when random access is performed, an incompletely coded region is not completely reconstructed.

When random access is performed, decoding of an incompletely coded region may be omitted by considering that an incompletely coded region is not completely reconstructed. Specifically, for an incompletely coded region, parsing of information for decoding may be omitted, and application of a series of decoding processes, e.g., prediction, transform, quantization and in-loop filtering, may be omitted.

In addition, when random access is performed, a value of samples within an incompletely coded region may be set as a setting value. A setting value is a predefined value in an encoder and a decoder and may be 0.

Alternatively, a setting value may be determined according to a bit depth. As an example, if a bit depth is N, $2^{(N-1)}$ may be determined as a setting value. As an example, if a bit depth is 10, 512, an intermediate value (i.e., $2^{(10-1)}$), may be determined as a setting value.

Alternatively, the minimum, maximum or intermediate value of a bit depth may be determined as a setting value.

Alternatively, a setting value may be determined by referring to a completely coded region or an intra region adjacent to an incompletely coded region. As an example, a sample positioned at a boundary of an intra region or a completely coded region may be padded to an incompletely coded region.

In summary, an intra region and a completely coded region may be completely reconstructed regardless of random access. Considering the characteristic, an intra region and a completely coded region that may be completely reconstructed even in random access may be referred to as a completely reconstructed region.

On the other hand, while an incompletely coded region may be completely reconstructed when it is not random access, it may not be completely reconstructed when it is not random access.

An intra region, a completely coded region and an incompletely coded region may be defined as a set of sub-pictures, slices, tiles or blocks. As an example, each of an intra region, a completely coded region and an incompletely coded region may be a set of CTUs or CUs.

In FIG. 6, it was illustrated that each of an intra region, a completely coded region and an incompletely coded region has a square shape. Unlike an example shown, each region may have a shape different from a square shape. As an example, according to scan order, N sub-pictures, slices, tiles or blocks may constitute an intra region, a completed coded region or an incompletely coded region.

In addition, a size of each region may be different from that shown.

In an encoder, information for defining each region in a picture may be encoded and signaled. The information may include at least one of information showing a size of a region, information showing a position of a region within a picture, or information showing an index of a sub-picture, a slice, a tile or a block constituting a picture. Here, information showing a size of a region may include at least one of width information or height information of a region. In addition, a width or a height of a region may be calculated in a unit of a sub-picture, a slice, a tile or a block. Information showing a position of a region within a picture may be information identifying a first or last one among sub-pictures, slices, tiles or blocks constituting a region.

Information defining a region may be encoded and signaled for each of an intra region, a completely coded region and an incompletely coded region. As an example, for each picture in a random access group, information indicating each of an intra region, a completely coded region and an incompletely coded region may be encoded and signaled.

As another example, for a first picture in a random access group, only an intra region is set as a completely reconstructed region, while for other pictures, an intra region and a completely coded region are set as a completely reconstructed region. In this case, since a completely coded region is a region corresponding to a completely reconstructed region (i.e., an intra region and a completely coded region) of a previous picture, there is no need to explicitly encode information for specifying a completely coded region.

Accordingly, for each picture, only information for specifying an intra region may be encoded and signaled.

As an example, in an example shown in FIG. 6, a completely reconstructed region of picture P5 corresponding to a random access position includes only an intra region. For picture P5 which is a random access position, information on an intra region may be encoded and signaled. All remaining regions excluding an intra region in picture P5 may be set as an incompletely coded region.

A completely reconstructed region of picture P6 may include a completely coded region and an intra region. A completely coded region of picture P6 may be defined as a completely reconstructed region of previous picture P5, i.e., a region with the same position and size as an intra region. Accordingly, even if information on a completely coded region of picture P6 is not encoded, a position and a size of a completely coded region of picture P6 may be determined by referring to a completely reconstructed region of previous picture P5. Accordingly, even for picture P6, only information on an intra region may be encoded and signaled. The remaining regions excluding a completely reconstructed region in picture P6 may be set as an incompletely coded region.

A completely reconstructed region of picture P7 may include a completely coded region and an intra region. A completely coded region of picture P7 may be defined as a region with the same position and size as a completely reconstructed region of previous picture P6. Accordingly, even if information on a completely coded region of picture P7 is not encoded, a position and a size of a completely coded region of picture P7 may be determined by referring to a completely reconstructed region of previous picture P6. Accordingly, even for picture P7, only information on an intra region may be encoded and signaled. The remaining regions excluding a completely reconstructed region in picture P7 may be set as an incompletely coded region.

For last picture P8 in a random access group, the entire region is set as a completely reconstructed region. Specifically, a completely coded region of picture P8 may be defined as a region with the same position and size as a completely reconstructed region of previous picture P7. And, the remaining regions excluding a completely coded region of picture P8 may be defined as an intra region. Accordingly, for last picture P8 in a random access group, encoding/decoding of information for specifying an intra region may be omitted.

Each region may be specified based on a prediction type of a sub-picture, a slice or a tile. As an example, a slice whose prediction type is I may be set as an intra region of a corresponding picture. On the other hand, a slice whose prediction type is P may be set as a completely coded region only when a slice corresponding to a corresponding slice in a previous picture is a completely reconstructed region (i.e., an intra region or a completely coded region). As an example, if a slice of a previous picture corresponding to P slice in a current picture is I slice, P slice in a current picture may be set as a completely coded region. Alternatively, if a slice of a previous picture corresponding to P slice in a current picture is P slice and P slice of a previous picture corresponds to I slice of a second previous picture, P slice in a current picture may be set as a completely coded region. If a slice of a previous picture corresponding to P slice in a current picture is not an intra region or a completely coded region, P slice in a current picture may be set as an incompletely coded region.

Alternatively, a slice whose prediction type is P may be set as a completely coded region only when a slice corresponding to a corresponding slice in a previous picture is an intra region.

Meanwhile, a slice whose prediction type is B may always be set as an incompletely coded region.

Each of an intra region, a completely coded region and an incompletely coded region may be defined as one sub-picture, tile or slice, and for each of sub-pictures, tiles or slices, an index indicating a characteristic of a corresponding region may be encoded and signaled. The index may indicate whether a corresponding region is an intra region, a completely coded region or an incompletely coded region.

As described, an intra region, a completely coded region and an incompletely coded region may be determined based on a partition structure of a sub-picture, a virtual boundary, a tile or a slice. In this case, pictures belonging to a random access group may be set as one sequence, and all pictures in a sequence, i.e., all pictures in a random access group may be set to have a sub-picture partition structure, a virtual boundary partition structure, a tile partition structure or a slice partition structure.

When each region is determined based on a sub-picture, a virtual boundary, a tile or a slice, etc., at a boundary between regions, whether encoding/decoding may be performed by referring to information on another region may be predefined in an encoder and a decoder. As an example, at a boundary between an intra region and a completely coded region, encoding/decoding may be performed by referring to information on another region.

On the other hand, in random access, in order to ensure complete encoding/decoding of a completely reconstructed region, when a completely reconstructed region, i.e., an intra region and/or a completely coded region are encoded/decoded, it may be set not to refer to information of an incompletely coded region. As an example, in order to perform inter prediction, when motion information of a surrounding block is considered, if a surrounding block belongs to an incompletely coded region, motion information of a surrounding block belonging to an incompletely coded region may be set to be unavailable. Alternatively, the application of an in-loop filter at a boundary with an incompletely coded region is omitted, while an in-loop filter may be set to be applied to a boundary between an intra region and a completely coded region.

Alternatively, information showing whether encoding/decoding may be performed by referring to information of another region may be encoded and signaled. The information may be a 1-bit flag. As an example, at a boundary between an intra region and a completely coded region, a flag showing whether it is allowed to refer to information of another region may be encoded. Meanwhile, for a boundary with an incompletely coded region, without encoding/decoding a flag, it may be set not to refer to information of another region.

As another example, it may be set not to allow reference to information of another region at a boundary between an intra region and a completely coded region. Alternatively, according to a predetermined condition, whether it is allowed to refer to information of another region at a boundary between two regions may be determined.

Alternatively, per coding technology, information showing whether reference to information of another region is allowed may be encoded and signaled. As an example, at a boundary between an intra region and a completely coded region, information showing whether application of an in-loop filter is allowed may be encoded and signaled.

Meanwhile, in order to minimize an intra region within a picture, a completely coded region of a current picture may be set to have a larger size than a completely reconstructed region of a previous picture.

Figure 7:
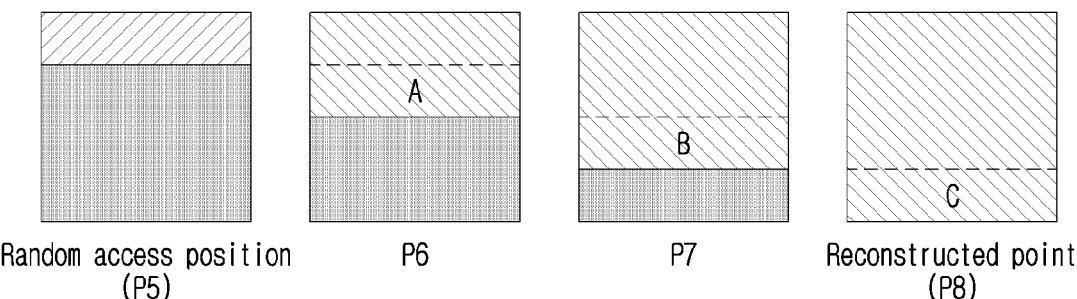
FIG. 7 shows an example in which a completely coded region of each picture belonging to a random access group is set.

FIG. 7 shows an example in which a completely coded region of each picture belonging to a random access group is set.

A comparison between FIG. 6 and FIG. 7 may show that an intra region of picture P6 to P8 in FIG. 6 is changed into a completely coded region in FIG. 7. In other words, in region A to C corresponding to an intra region of picture P6 to P8 in FIG. 6, in addition to intra prediction, inter prediction referring to a completely reconstructed region of a previous picture may be possible. As an example, blocks included in region A may be encoded/decoded through intra prediction or inter prediction referring to a completely reconstructed region of picture P5 (i.e., an intra region of picture P5). Likewise, blocks included in region B may be encoded/decoded through intra prediction, inter prediction referring to a completely reconstructed region of picture P5 or inter prediction referring to a completely reconstructed region of picture P6. Likewise, blocks included in region C may be encoded/decoded through intra prediction, inter prediction referring to a completely reconstructed region of picture P5, inter prediction referring to a completely reconstructed region of picture P6 or inter prediction referring to a completely reconstructed region of picture P7.

When a completely coded region is set in a manner above, information showing an intra region for each picture may be replaced with information showing the remaining completely reconstructed regions excluding a completely reconstructed region of a previous picture in a completely reconstructed region of each picture.

In FIGS. 6 and 7, it was assumed that a completely coded region in a current picture is configured to include a region corresponding to a completely reconstructed region of a previous picture. It means that a completely coded region in a current picture may be encoded/decoded by referring to only a completely reconstructed region of previous pictures. In other words, when inter prediction is applied to a block belonging to a completely coded region in a current picture, a motion vector of the block must indicate at least one completely reconstructed region among previous pictures and must not indicate an incompletely coded region.

Meanwhile, when a picture whose encoding/decoding order is later than that of pictures belonging to a random access group is encoded/decoded, inter prediction may be performed by referring to pictures belonging to a random access group. However, when random access is performed, the remaining pictures excluding a last picture among pictures belonging to a random access group include an incompletely coded region that is not completely reconstructed.

Figure 8:
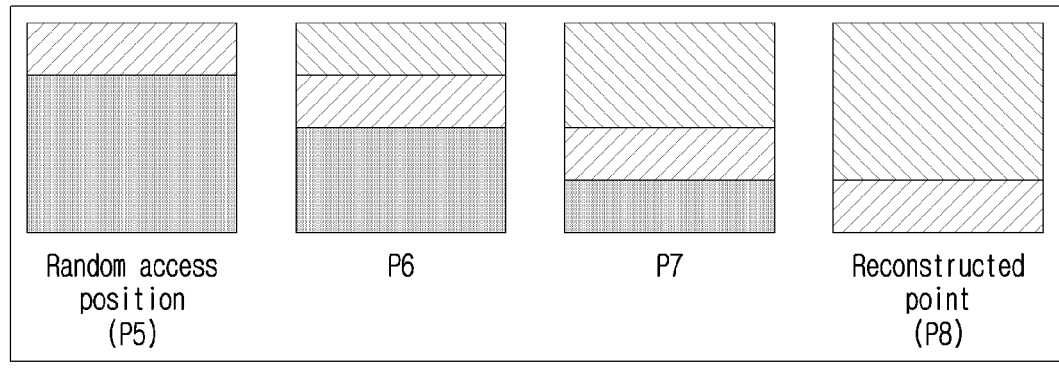
FIGS. 8 and 9 show a method for setting a motion vector of a current block.
Figure 9:
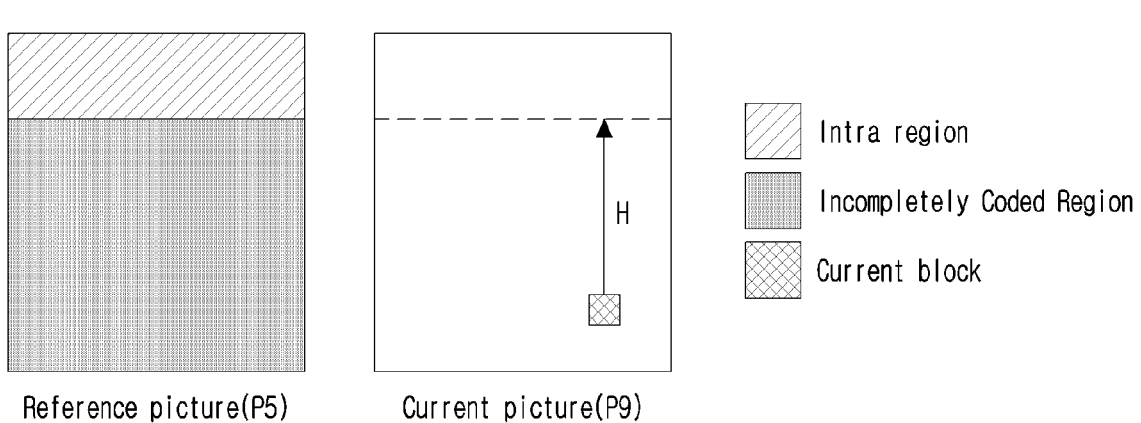

FIGS. 8 and 9 show a method for setting a motion vector of a current block, considering restrictions above.

When a picture (e.g., picture P9 in FIG. 5) whose coding/decoding order is later than that of pictures belonging to a random access group is encoded/decoded, inter prediction using at least one of pictures belonging to a random access group as a reference picture may be performed. As an example, FIG. 8 shows a configuration example of a reference picture buffer when encoding/decoding blocks belonging to picture P9.

In this case, when a picture that is later in encoding/decoding order than pictures belonging to a random access group uses a picture belonging to a random access group as a reference picture, it may be set to refer only to a completely reconstructed region in a reference picture.

As an example, when picture P9 shown in FIG. 5 performs inter prediction by referring to picture P5, a completely reconstructed region of picture P5 may be referred to, but an incompletely coded region of picture P5 may not be referred to.

In other words, when inter prediction of a block belonging to picture P9 is performed by using picture P5 as a reference picture, a motion vector of the block must indicate the inside of a completely reconstructed region of picture P5.

If restrictions above are considered, when a current block in picture P9 is positioned outside a region corresponding to a completely reconstructed region of picture P5, a motion vector of the current block must have a larger value than a distance between the current block and a boundary of a completely reconstructed region of the picture P5.

Considering this, instead of encoding a motion vector of a current block as it is, a value obtained by subtracting a distance between a current block and a boundary of a completely reconstructed region of the picture P5 from a motion vector of a current block may be encoded.

As an example, in an example shown in FIG. 9, the minimum distance between a current block and a completely reconstructed region of picture P5 is H. Meanwhile, a motion vector of a current block must indicate the inside of a completely reconstructed region of picture P5. Accordingly, a motion vector of a current block must have a value greater than H.

Considering this, when encoding/decoding a motion vector of a current block, a value obtained by subtracting H, the minimum distance from a current block to a completely reconstructed region in a reference picture, may be encoded/decoded. For example, when a vertical distance between a current block and a reference block in a reference picture is y, instead of encoding/decoding y as it is, (y−H) may be encoded/decoded. In other words, an encoder may encode a value derived by subtracting the minimum distance between a current block and a completely reconstructed region in a reference picture from a motion vector of a current block.

A decoder may decode a difference value signaled through a bitstream and add a distance between a current block and a completely reconstructed region in a reference picture to a decoded motion vector (i.e., a difference motion vector) to derive a final motion vector.

Alternatively, a sum of H, a distance between a current block and a completely reconstructed region, and H', a height of a current block, may be subtracted. In other words, if a vertical distance between a current block and a reference block in a reference picture is y, instead of encoding/decoding y as it is, (y−(H+H')) may be encoded/decoded.

Unlike an example described above, when encoding/decoding a picture that does not belong to a random access group, only a picture where an incompletely coded region does not exist among pictures belonging to a random access group may be set to be available as a reference picture. Here, a picture where an incompletely coded region does not exist may refer to a picture that is last in output order in a random access group.

Figure 10:
FIG. 10 shows a configuration example of a reference picture buffer.

FIG. 10 shows a configuration example of a reference picture buffer according to restrictions above.

When encoding/decoding picture P9 that does not belong to a random access group, only a picture where an incompletely reconstructed region does not exist among pictures belonging to a random access group, i.e., last picture P8 in a random access group, may be used as a reference picture.

As another example, availability of a reference picture may be determined by considering whether a position corresponding to a current block in a reference picture belongs to an incompletely coded region. As an example, if a position corresponding to a current block in a reference picture belongs to a completely reconstructed region, a corresponding reference picture may be available when encoding/decoding the current block. On the other hand, if a position corresponding to a current block in a reference picture belongs to an incompletely coded region, a corresponding reference picture may not be available when encoding/decoding the current block.

As an example, in an example shown in FIG. 8, it is assumed that a position corresponding to a current block based on picture P5 belongs to a completely reconstructed region of picture P5. A completely reconstructed region of picture P5, a random access point, corresponds to a completely reconstructed region of all pictures belonging to a random access group. Accordingly, when encoding/decoding a current block belonging to picture P9, inter prediction using at least one of picture P5 to P8 may be possible. Accordingly, index information specifying at least one of four available reference pictures may be encoded and signaled.

On the other hand, in an example shown in FIG. 8, it is assumed that a position corresponding to a current block based on picture P7 belongs to an intra region of picture P7. For picture P5 and P6 that are earlier in output order than picture P7, a region corresponding to an intra region of picture P7 is an incompletely coded region. Accordingly, when encoding/decoding a current block belonging to picture P9, picture P5 and P6 are not available as a reference picture. On the other hand, for picture P8 that is later in output order than picture P7, a region corresponding to an intra region of picture P7 is set as a completely coded region. Accordingly, when encoding/decoding a current block belonging to picture P9, picture P7 and P8 may be available as a reference picture. Accordingly, index information specifying at least one of two available reference pictures may be encoded and signaled.

Meanwhile, as described above, when random access is not performed, an incompletely coded region of pictures belonging to a random access group may be also completely reconstructed. As an example, when random access is not performed, an incompletely coded region of picture P5, a random access point, may be completely reconstructed by referring to a picture encoded/decoded before picture P5.

However, in this case, a problem occurs in which a configuration of a Decoded Picture Buffer (DPB) is different when random access is performed and when it is not. As an example, when random access is not performed, a picture (e.g., picture P3 or picture P4, etc.) whose output order is earlier than P5, a random access point, may exist in a DPB buffer. On the other hand, when random access is performed, a picture whose output order is earlier than P5, a random access point, does not exist in a DPB buffer. In order to solve this problem, when random access is performed, a previous reference picture referred to by P5, a random access point, may be virtually generated by using inter prediction information in an incompletely coded region of P5, a random access point. A virtual reference picture may mean that a pixel value is filled with random values and generated. In this case, an incompletely coded region of P5, a random access point, is reconstructed to a random value that is a pixel value in a virtual reference picture, not an original sample value.

In other words, when random access is not performed, there are reconstructed reference pictures whose output order is earlier than P5, a random access point, in a reference picture buffer, while when random access is performed, there are virtual reference pictures whose output order is earlier than P5, a random access point, but whose sample value is set as a random value in a reference picture buffer.

Alternatively, unlike an example above, according to whether random access is performed, after encoding/decoding of a picture at a random access position (i.e., P5) is completed, pictures whose output order is earlier than a picture at a random access position may be removed from a DPB. In other words, after encoding/decoding of a picture at a random access position is completed, a DPB (or, a reference picture buffer) may be reset (initialized). In this case, an incompletely coded region of a picture (e.g., picture P6 to P8) whose output order is later than a picture at a random access position may not use a picture whose output order is earlier than a picture at a random access position as a reference picture.

As a result, among pictures belonging to a random access group, the remaining pictures excluding a picture at a random access position do not use a picture whose output order is earlier than a picture at a random access position as a reference picture, regardless of whether random access is performed.

FIG. 11 is a flowchart showing a method for decoding a picture according to an embodiment of the present disclosure.

When decoding a picture that is a random access point, a decoding method may be different according to whether random access is performed S1110. If random access is not performed, a picture that is a random access point may be reconstructed and output S1120 and S1130.

On the other hand, when random access is performed, pictures belonging to a random access group may be sequentially decoded S1140. Then, a last picture belonging to a random access group may be output as a reconstructed picture S1150.

When embodiments described based on a decoding process or an encoding process are applied to an encoding process or a decoding process, it is included in a scope of the present disclosure. When embodiments described in predetermined order are changed in order different from a description, it is also included in a scope of the present disclosure.

The above-described disclosure is described based on a series of steps or flow charts, but it does not limit a time series order of the present disclosure and if necessary, it may be performed at the same time or in different order. In addition, each component (e.g., a unit, a module, etc.) configuring a block diagram in the above-described disclosure may be implemented as a hardware device or software and a plurality of components may be combined and implemented as one hardware device or software. The above-described disclosure may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL AVAILABILITY

The present disclosure may be applied to an electronic device which may encode/decode an image.

The invention claimed is:

1. A method of decoding a video, the method comprising:
decoding a plurality of pictures included in a random access group,
wherein a size of a completely reconstructed region is gradually increased over the plurality of pictures in the random access group,
wherein a completely reconstructed region of a first picture in the random access group consists only of intra-coded regions,
wherein a last picture of the random access group is entirely composed of a completely reconstructed region,
wherein in response to a current picture being one of the plurality of pictures except for the first picture and the last picture, the current picture consists of a completely reconstructed region and an incompletely coded region,
wherein the completely reconstructed region of the current picture consists of an intra coded region and a completely coded region,
wherein a size and a position of the completely coded region of the current picture correspond to a completely reconstructed region of a previous coded picture, and
wherein information in the incompletely coded region of the current picture is not referred to for decoding the completely reconstructed region of the current picture.

2. The method of claim 1, wherein the completely reconstructed region and the incompletely coded region in the current picture is distinguished by a virtual line.

3. The method of claim 1, wherein an in-loop filter is not performed across a boundary between the completely reconstructed region and the incompletely coded region.

4. The method of claim 2, wherein
the completely coded region in the current picture is reconstructed through at least one of an intra prediction or an inter prediction, and
wherein the inter prediction is performed by using a picture whose output order is earlier than that of the current picture in the random access group as a reference picture.

5. The method of claim 4, wherein the incompletely coded region in the current picture is not referred to derive motion information of a block included in the completely coded region.

6. The method of claim 4, wherein the intra prediction for a block included in the completely reconstructed region is performed based on reference samples, and
wherein in response to a position of a reference sample is included in the incompletely coded region in the current picture, it is determined that the position is not available to derive the reference sample.

7. The method of claim 1, wherein
a prediction type of each of the plurality of pictures in the random access group is a P type.

8. The method of claim 1, wherein
when decoding the first picture in the random access group is completed, a decoded picture buffer (DPB) is initialized.

9. The method of claim 1, wherein
for an inter coded picture whose output order is later than that of the plurality of pictures in the random access group, only the last picture among the plurality of pictures in the random access group is available as a reference picture for inter prediction.

10. The method of claim 1, wherein in response to a reference picture of a current block in the current picture is one of the plurality of pictures in the random access group, a motion vector of the current block is forced to indicate an inside of a completely reconstructed region in the reference picture.

11. The method of claim 10, wherein in response to a size of the completely reconstructed region in the reference picture being less than that in the current picture and the current block being included in the completely coded region in the current picture,
the motion vector of the current block is derived by adding a motion vector difference value to a distance between the current block and the completely reconstructed region in the reference picture.

12. The method of claim 1, wherein
information indicating a size of the random access group is explicitly signaled through a bitstream.

13. A method of encoding a video, the method comprising:
encoding a plurality of pictures included in a random access group,
wherein a size of a completely reconstructed region is gradually increased over the plurality of pictures in the random access group,
wherein a completely reconstructed region of a first picture in the random access group consists only of intra-coded regions,
wherein a last picture of the random access group is entirely composed of a completely reconstructed region,
wherein in response to a current picture being one of the plurality of pictures except for the first picture and the last picture, the current picture consists of a completely reconstructed region and an incompletely coded region,
wherein the completely reconstructed region of the current picture consists of an intra coded region and a completely coded region,
wherein a size and a position of the completely reconstructed region of the current picture correspond to a completely reconstructed region of a previous coded picture, and
wherein information in the incompletely coded region of the current picture is not referred to for encoding the completely reconstructed region of the current picture.

14. A device for transmitting compressed video data, comprising:
a processor configured to obtain the compressed video data by
encoding a plurality of pictures in a random access group; and
a transmitter configured to transmit the compressed video data,
wherein a size of a completely reconstructed region is gradually increased over the plurality of pictures in the random access group,
wherein a completely reconstructed region of a first picture in the random access group consists only of intra-coded regions,
wherein a last picture of the random access group is entirely composed of a completely reconstructed region,
wherein in response to a current picture being one of the plurality of pictures except for the first picture and the last picture, the current picture consists of a completely reconstructed region and an incompletely coded region,
wherein the completely reconstructed region of the current picture consists of an intra coded region and a completely coded region, wherein a size and a position of the completely coded region of the current picture correspond to a completely reconstructed region of a previous coded picture, and wherein information in the incompletely coded region of the current picture is not referred to for encoding the completely reconstructed region of the current picture.

\* \* \* \* \*